(12) United States Patent
Oe et al.

(10) Patent No.: US 10,495,184 B2
(45) Date of Patent: Dec. 3, 2019

(54) ECCENTRIC OSCILLATING REDUCTION GEAR DEVICE

(71) Applicant: DENSO CORPORATION, Kariya, Aichi-pref. (JP)

(72) Inventors: Hiroaki Oe, Kariya (JP); Takashi Furukawa, Kariya (JP); Yukihiro Jo, Kariya (JP); Yukihiro Honda, Kariya (JP)

(73) Assignee: DENSO CORPORATION, Kariya (JP)

( * ) Notice: Subject to any disclaimer, the term of this patent is extended or adjusted under 35 U.S.C. 154(b) by 107 days.

(21) Appl. No.: 15/901,928

(22) Filed: Feb. 22, 2018

(65) Prior Publication Data

US 2018/0266518 A1 Sep. 20, 2018

(30) Foreign Application Priority Data

Mar. 15, 2017 (JP) .................................. 2017-49780

(51) Int. Cl.
| | |
|---|---|
| *F16H 1/32* | (2006.01) |
| *F01L 1/352* | (2006.01) |
| *F16H 57/08* | (2006.01) |
| *F16H 35/00* | (2006.01) |
| *F01L 1/04* | (2006.01) |
| *F01L 1/02* | (2006.01) |

(52) U.S. Cl.
CPC ............... *F16H 1/32* (2013.01); *F01L 1/352* (2013.01); *F16H 35/008* (2013.01); *F16H 57/08* (2013.01); *F01L 1/02* (2013.01); *F01L 1/022* (2013.01); *F01L 1/04* (2013.01); *F16H 2001/325* (2013.01)

(58) Field of Classification Search
None
See application file for complete search history.

(56) References Cited

U.S. PATENT DOCUMENTS

| | | | |
|---|---|---|---|
| 6,220,107 B1 | 4/2001 | Wang | |
| 6,848,401 B2 * | 2/2005 | Takenaka | F01L 1/352 |
| | | | 123/90.15 |
| 7,377,245 B2 * | 5/2008 | Morii | F01L 1/022 |
| | | | 123/90.15 |
| 7,395,791 B2 * | 7/2008 | Isobe | F01L 1/344 |
| | | | 123/90.15 |
| 7,458,351 B2 * | 12/2008 | Takenaka | F01L 1/344 |
| | | | 123/90.15 |
| 7,938,748 B2 * | 5/2011 | Minegishi | F03D 7/0204 |
| | | | 475/163 |
| 9,856,761 B2 * | 1/2018 | Iwasaki | F01L 1/022 |
| 9,920,660 B2 * | 3/2018 | Kohrs | F01L 1/352 |
| 10,107,155 B2 * | 10/2018 | Lee | F01L 9/04 |
| 10,151,222 B2 * | 12/2018 | Burke | F01L 1/047 |

(Continued)

*Primary Examiner* — Dirk Wright

(57) ABSTRACT

A second rotor and a third rotor are accommodated in a first rotor. A fitting portion of the third rotor is located in an engagement hole of the second rotor to engage the third rotor with the second rotor. The third rotor is rotational about an axis, which is eccentric to an axis of the first rotor, to vary a relative rotational phase of the first rotor to the second rotor and to accelerate and decelerate rotation of the second rotor. When friction arises between the second rotor and the fitting portion, a frictional force acts in a direction to reduce a rotational moment acting on the third rotor. A friction coefficient between the second rotor and the fitting portion is greater than a friction coefficient between ferrous objects.

10 Claims, 13 Drawing Sheets

(56) References Cited

U.S. PATENT DOCUMENTS

2018/0073655 A1\* 3/2018 Miyachi .................. F01L 1/047
2018/0320771 A1\* 11/2018 Thielen ................. F16H 49/001
2018/0328239 A1\* 11/2018 Tadokoro ............ F01L 1/34403
2018/0371964 A1\* 12/2018 Miyachi .................. F01L 1/352

\* cited by examiner

ECCENTRIC OSCILLATING REDUCTION GEAR DEVICE

CROSS REFERENCE TO RELATED APPLICATION

This application is based on Japanese Patent Application No. 2017-49780 filed on Mar. 15, 2017, the disclosure of which is incorporated herein by reference.

TECHNICAL FIELD

The present disclosure relates to an eccentric oscillating reduction gear device.

BACKGROUND

A known eccentric oscillating reduction gear device includes two rotors. The two rotors are accommodated in a container-shaped rotor member and eccentrically rotational in a state where a relative phase therebetween is shifted 180 degrees. In the configuration employing the two rotors, vibration and noise possibly arise. Patent Literature 1 proposes an eccentric oscillating reduction gear device including three rotors.

Patent Literature 1

Publication of unexamined Japanese patent application No. 2000-120809

The eccentric oscillating reduction gear device of Patent Literature 1 includes the three rotors in order to restrict vibration and noise, and consequently, its entire structure could be enlarged. In addition, the number of components of the eccentric oscillating reduction gear device increases, and consequently, its manufacturing cost may increase. It is assumable to reduce the number of rotors in order to downsize and to decrease a manufacturing cost of an eccentric oscillating reduction gear device.

SUMMARY

In a case where an eccentric oscillating reduction gear device includes two rotors, a rotational moment (couple of force) could act onto the two rotors. Consequently, the axes of the two rotors may shift, and friction may arise between the two rotors. Consequently, two rotors would cause vibration and noise.

It is an object of the present disclosure to produce an eccentric oscillating reduction gear device configured to restrict vibration and noise and to enable its downsizing.

According to one aspect of the present disclosure, an eccentric oscillating reduction gear device comprises a first rotor being rotational. The eccentric oscillating reduction gear device further comprises a second rotor accommodated in the first rotor. The second rotor is rotational and has an engagement hole. The eccentric oscillating reduction gear device further comprises a third rotor accommodated in the first rotor and opposed to the second rotor. The third rotor is configured to vary a relative rotational phase of the first rotor to the second rotor and to accelerate and decelerate rotation of the second rotor, when rotating about an axis, which is eccentric relative to an axis of the first rotor. The eccentric oscillating reduction gear device further comprises a fitting portion equipped to the third rotor. The fitting portion has an outer surface opposed to an inner surface of the second rotor. The inner surface of the second rotor is located in the engagement hole. The fitting portion in the engagement hole is engaged with the second rotor. When friction arises between the inner surface of the second rotor and the outer surface of the fitting portion, a frictional force acts in a direction to reduce a rotational moment, which acts on the third rotor. A friction coefficient between the inner surface of the second rotor and the outer surface of the fitting portion is greater than a friction coefficient between ferrous objects.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

Figure 1:
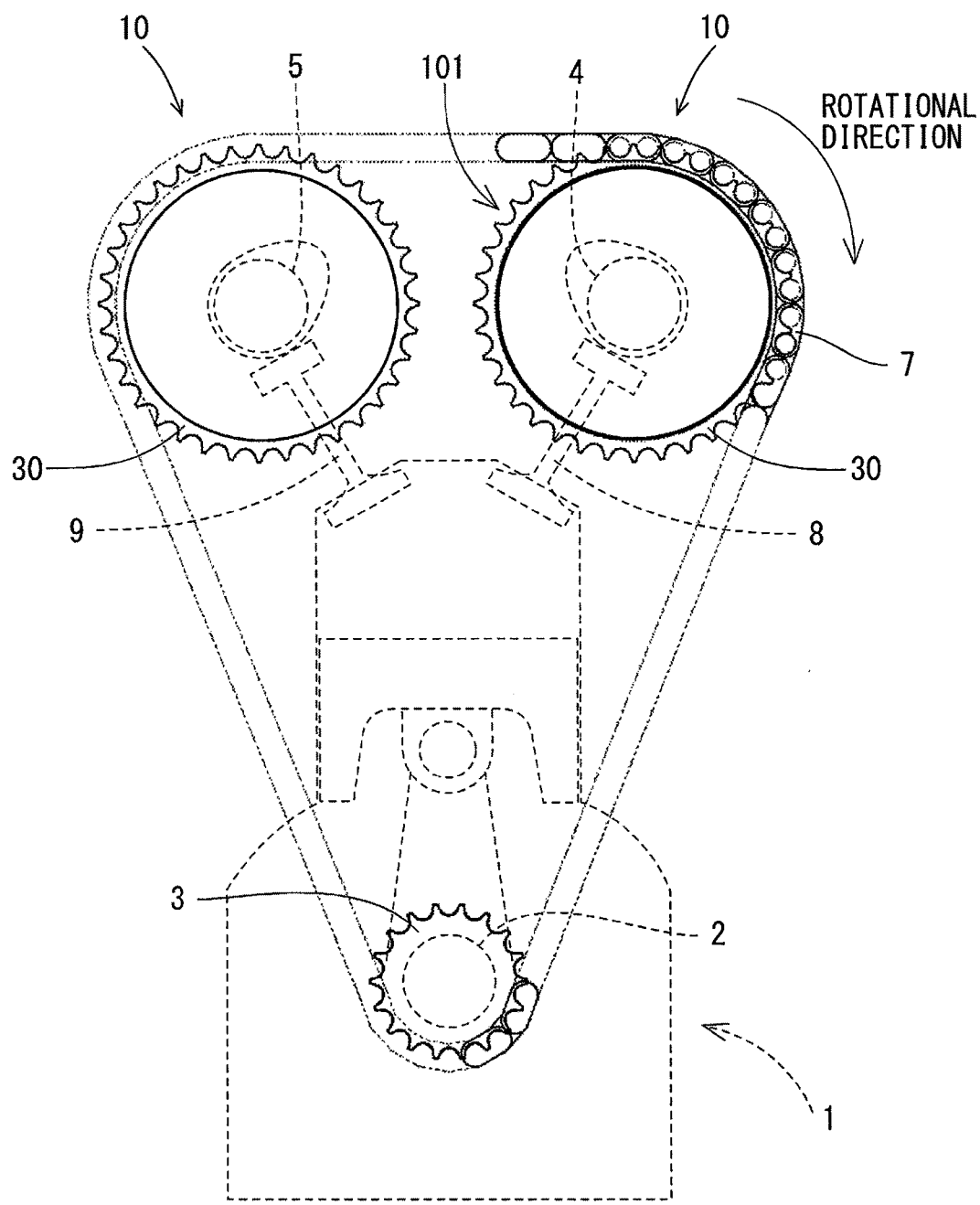
FIG. 1 is a schematic view showing a valve timing control device employing an eccentric oscillating reduction gear device according to a first embodiment of the present disclosure.

As follows, an eccentric oscillating reduction gear device according to embodiments of the present disclosure will be described with reference to drawings. In the following description of multiple embodiments, substantially the same configuration is denoted with the same reference numeral and description of the configuration will be omitted. The wording of present embodiment may comprehend multiple embodiments. The eccentric oscillating reduction gear device of the embodiment is used in, for example, a valve timing control device of an internal combustion engine to control a valve timing of at least one of an intake valve and an exhaust valve.

As follows, a valve timing control device 10 used for the eccentric oscillating reduction gear device 101 of the present embodiment will be described. As shown in FIG. 1, a chain 7 is wound around a crank gear 3 and first rotors 30 of the eccentric oscillating reduction gear devices 101 in an internal combustion engine 1. The crank gear 3 is affixed to a crankshaft 2, which is a driving shaft of the internal combustion engine 1. The first rotors 30 of the eccentric oscillating reduction gear devices 101 are affixed to camshafts 4 and 5, which are driven shafts, respectively. Torque is transmitted from the crankshaft 2 to the camshafts 4 and 5 via the chain 7. One camshaft 4 drives an intake valve 8. The other camshaft 5 drives an exhaust valve 9.

The valve timing control device 10 varies a relative rotation phase of the crankshaft 2 to the camshafts 4 and 5 thereby to control an opening-and-closing time point of corresponding one of the intake valve 8 and the exhaust valve 9. The eccentric oscillating reduction gear device 101 enables to vary the relative rotation phase of the crankshaft 2 to the camshafts 4 and 5.

A first rotor 30 rotates in synchronisation with the crankshaft 2. The valve timing control device 10 is configured to rotate the camshaft 4 or 5 relatively to the first rotor 30 in the same rotational direction as the crankshaft 2. In this way, the valve timing control device 10 accelerates a valve timing of the intake valve 8 or the exhaust valve 9. The operation of the camshafts 4 and 5 to rotate relatively thereby to accelerate the valve timing of the intake valve 8 or the exhaust valve 9 is referred to as "to advance."

The valve timing control device 10 is further configured to rotate the camshaft 4 or 5 relatively to the first rotor 30, which rotates in synchronisation with the crankshaft 2, in the reverse rotational direction to the crankshaft 2. In this way, the valve timing control device 10 decelerates the valve timing of the intake valve 8 or the exhaust valve 9. The operation of the camshafts 4 and 5 to rotate relatively thereby to decelerate the valve timing of the intake valve 8 or the exhaust valve 9 is referred to as "to retard."

First Embodiment

Figure 2:
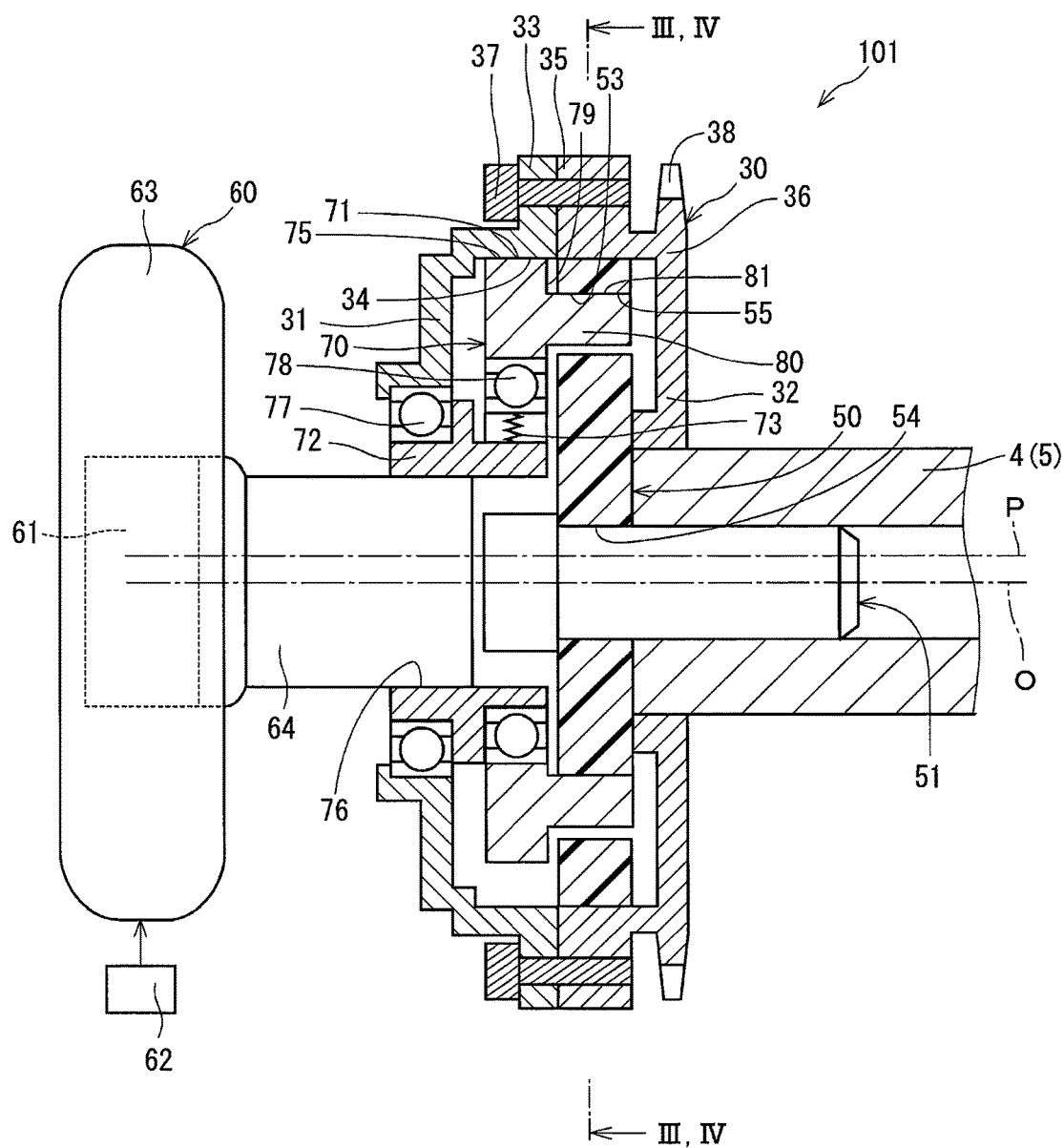
FIG. 2 is a sectional view showing the eccentric oscillating reduction gear device.

As shown in FIG. 2, the eccentric oscillating reduction gear device 101 includes a first rotor 30, a second rotor 50, a control unit 60, a third rotor 70, and fitting portions 80. The first rotor 30 is formed by combining a gear member 31 coaxially with a sprocket 32 in a container shape. The first rotor 30 forms a space therein. The first rotor 30 is coaxial with and is rotational relative to the one camshaft 4 or the other camshaft 5.

The gear member 31 is in a bottomed tubular shape and includes a gear projected portion 33 and a first internal gear portion 34. The gear projected portion 33 is extended radially outward from the gear member 31. The first internal gear portion 34 is formed on the inner circumferential periphery of the gear member 31, such that the tip circle of the first internal gear portion 34 is on the inner side of the root circle of the first internal gear portion 34 in the radial direction of the gear member 31.

Figure 3:
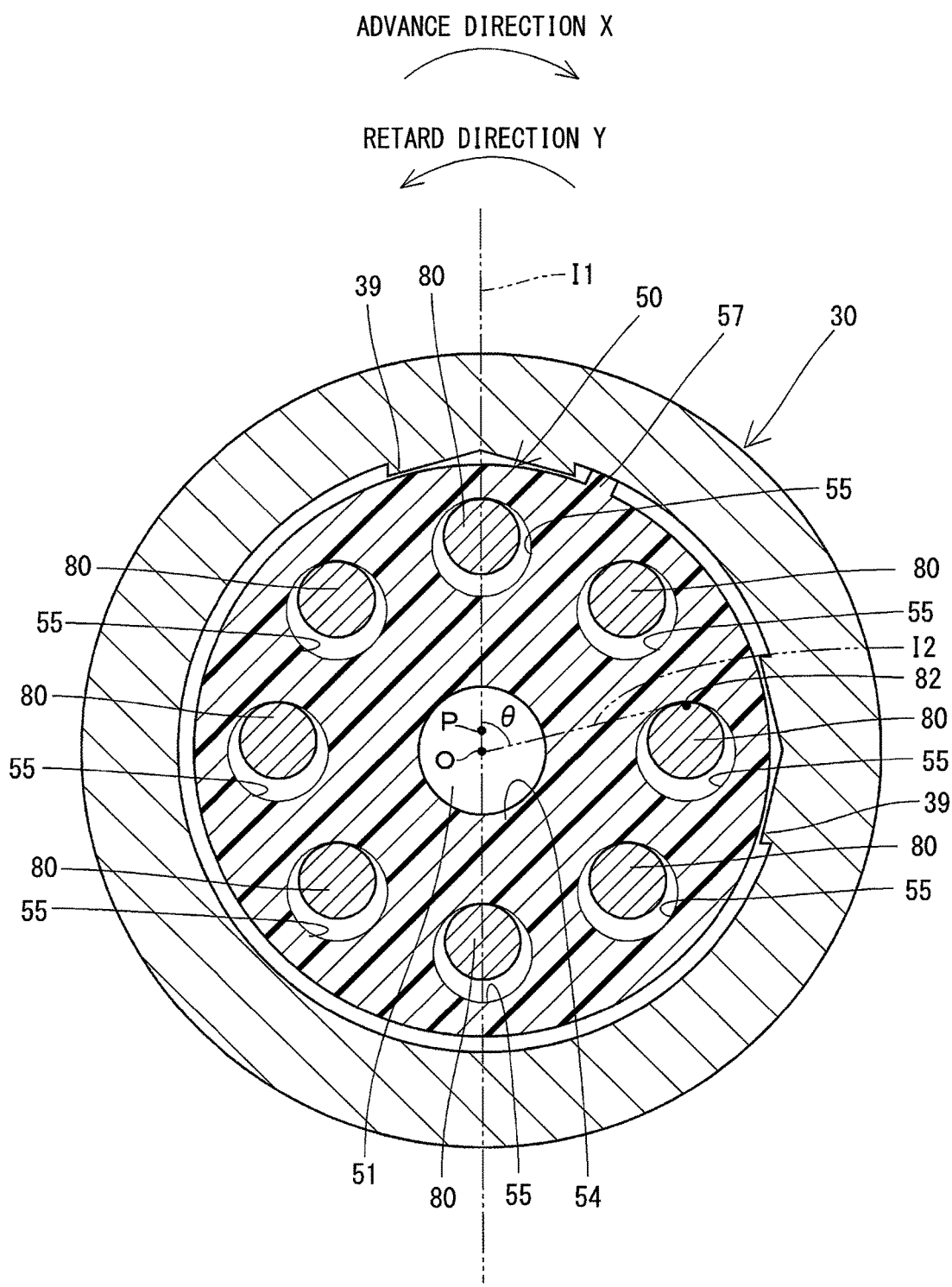
FIG. 3 is a sectional view taken along the line III, IV-III, IV in FIG. 2.

The sprocket 32 is in a bottomed tubular shape and includes a large diameter portion 35 and a small diameter portion 36. The large diameter portion 35 is affixed to the gear projected portion 33 by using a screw 37. That is, the gear member 31 and the sprocket 32 are joined integrally with each other by using the screw 37. In FIG. 3, the large diameter portion 35 includes multiple sprocket projected portions 39. The sprocket projected portions 39 extend radially inward from the inner periphery of the first rotor 30.

Referring back to FIG. 2, the small diameter portion 36 includes multiple sprocket teeth 38. The sprocket teeth 38 are extended radially outward from the sprocket 32. The chain 7 is wound around the sprocket teeth 38. When the sprocket 32 receives torque from the crankshaft 2 via the chain 7, the first rotor 30 rotates centered on the center axis O in conjunction with the crankshaft 2. In his state, the rotational direction of the first rotor 30 is in the clockwise direction in FIG. 1 according to the present embodiment.

The second rotor 50 is accommodated in the first rotor 30. The second rotor 50 is formed in a disc shape and has a center hole 54 at its center. A sleeve bolt 51 is inserted through the center hole 54 into the camshaft 4 or 5. The second rotor 50 is interposed between the sleeve bolt 51 and the camshaft 4 or 5 and is connected to the camshaft 4 or 5.

The phase of the second rotor 50 is fixed relative to the camshaft 4 or 5. The second rotor 50 is coaxial with the first rotor 30. The second rotor 50 is rotational in conjunction with the camshaft 4 or 5 about the center axis O. The second rotor 50 is supported inside the large diameter portion 35. The second rotor 50 is rotational relative to the first rotor 30. The second rotor 50 has at least one engagement hole 53. In the present example, the second rotor 50 has right engagement holes 53.

As shown in FIG. 3, each of the engagement holes 53 has a circular-shaped cross-section. In the present example, eight engagement holes 53 are formed inside the second rotor 50 and are on the common circle. The engagement holes 53 are uniform in diameter.

Furthermore, the second rotor 50 includes a second rotor projected portion 57, which corresponds to the sprocket projected portion 39. The second rotor projected portion 57 extends radially outward from the second rotor 50. When the second rotor 50 rotates relative to the first rotor 30, the sprocket projected portion 39 is retained by the second rotor projected portion 57 such that the second rotor 50 does not rotate excessively.

Referring back to FIG. 2, the control unit 60 includes an electric motor 61 and a control circuit 62. The electric motor 61 is, for example, a permanent magnet synchronous three-phase AC motor. The electric motor 61 is located on the opposite side of valve timing control device 10 from the camshaft 4 or 5. The electric motor 61 is accommodated in a motor case 63. The electric motor 61 includes a motor shaft 64. The motor shaft 64 is rotational in forward and reverse directions about the center axis O. The motor shaft 64 is supported by the motor case 63.

The control circuit 62 is configured mainly with a microcomputer and is equipped inside or outside the motor case 63. Processing of the control circuit 62 may be software processing produced by causing a CPU to execute a program, which is prestored in a tangible memory device such as a ROM. The processing of the control circuit 62 may be hardware processing produced by an exclusive electronic circuit.

The control circuit 62 is connected with the electric motor 61 to control the electric motor 61 according to an operation state of the internal combustion engine 1. The control circuit 62 operates to generate a rotational magnetic field around the motor shaft 64 and controls the electric motor 61. The motor shaft 64 outputs a rotational torque Tm in an advance direction X or a retard direction Y according to a direction of the rotational magnetic field.

The third rotor 70 is accommodated in the first rotor 30 and is opposed to the second rotor 50. The third rotor 70 is in a tubular shape and is connected with the motor shaft 64. The third rotor 70 is rotational in conjunction with the motor shaft 64 about the center axis O. The third rotor 70 includes a third external gear portion 71, an eccentric portion 72, and a spring 73. The spring 73 is a biasing member.

The third external gear portion 71 is formed on an outer wall of the third rotor 70 such that its tip circle is on the outer side of its root circle in the radial direction of the third rotor 70. The number of teeth of the third external gear portion 71 is set to be less than the number of teeth of the first internal gear portion 34. The third external gear portion 71 is fitted to and supported by an inner circumferential periphery of the first internal gear portion 34. The third external gear portion 71 is rotational relative to the first rotor 30. The third external gear portion 71 and the first internal gear portion 34 are fitted at a fitting portion 75.

The eccentric portion 72 is in a tubular shape and has a center hole 76 and an eccentric shaft P. The motor shaft 64 is inserted in the center hole 76. The motor shaft 64 is connected with the third rotor 70 via the center hole 76. The eccentric shaft P is eccentric relative to the center-axis O and is shifted toward the fitting portion 75. The eccentric portion 72 supports the gear member 31 via a bearing 77. Furthermore, the eccentric portion 72 supports the third external gear portion 71 via the spring 73 and a bearing 78.

The spring 73 is equipped between a portion of the eccentric portion 72, which is on the side of the fitting portion 75, and the bearing 78. The spring 73 biases the third rotor 70 via the bearing 78 and urges the third rotor 70 onto the gear member 31. In addition, the spring 73 urges the fitting portions 80 onto the second rotor 50.

The third rotor 70 is configured to rotate about the eccentric shaft P as a center axis. The third rotor 70 is further configured to revolve about the center axis O as another center axis. That is, the third rotor 70 is configured to perform a planetary motion and to rotate eccentrically relative to the center axis O. As the third rotor 70 eccentrically rotates, the relative rotational phase between the first rotor 30 and the third rotor 70 varies. The variation in the relative rotational phase enables the third rotor 70 to accelerate and decelerate rotation of the second rotor 50.

An end surface of the third rotor 70, which is opposed to the second rotor 50, is a third rotor end surface 79. The fitting portions 80 are formed integrally with the third rotor 70. The fitting portions 80 extend from the third rotor end surface 79 toward the second rotor 50. Each of the fitting portions 80 has a circular cross-section. The fitting portions 80 are located at positions corresponding to the engagement holes 53 and are inserted in the engagement holes 53, respectively. The number of the fitting portions 80 is eight corresponding to the number of the engagement holes 53.

An outer surface of the fitting portion 80 is a fitting portion outer surface 81. An inner surface of the second rotor 50 is a second rotor inner surface 55. The fitting portion outer surface 81 and the second rotor inner surface 55 are in contact with each other. The fitting portion 80 and the second rotor 50 are engaged with each other. The second rotor 50 and the third rotor 70 are engaged with each other via the fitting portion 80. The fitting portion 80 is smaller than the engagement hole 53. The fitting portion 80 and the engagement hole 53 therefore form a clearance therebetween.

Referring back to FIG. 3, an imaginary split line 11 splits the second rotor 50 into two portions. The fitting portion outer surface 81 and the second rotor inner surface 55 are in contact with each other via a fitting portion contact point 82 when the third rotor 70 rotates relative to the second rotor 50. An imaginary line 12 extends from the center axis O to the fitting portion contact point 82. The imaginary split line 11 is at an angle e with respect to the imaginary line 12.

(Operation)

As follows, an operation of the eccentric oscillating reduction gear device 101 of the present embodiment will be described. When the motor shaft 64 does not rotate relative to the first rotor 30, the third rotor 70 rotates together with both the first rotor 30 and the second rotor 50 while maintaining an engagement position relative to the first rotor 30. In the present state, the relative rotational phase between the first rotor 30 and the second rotor 50 is maintained, and therefore, the valve timing is maintained.

When the motor shaft 64 rotates relative to the first rotor 30 in the advance direction X, the motor shaft 64 outputs a rotational torque Tm in the advance direction X. In this way, the third rotor 70 performs the planetary motion while varying the engagement position between the third rotor 70 and the first rotor 30. In the present state, the second rotor 50 rotates relative to the first rotor 30 in the retard direction Y. Thus, rotation of the second rotor 50 is decelerated, and the valve timing of the intake valve 8 or the exhaust valve 9 is retarded.

When the motor shaft 64 rotates relative to the first rotor 30 in the retard direction X, the motor shaft 64 outputs a rotational torque Tm in the retard direction X. In this way, the third rotor 70 performs the planetary motion while varying the engagement position between the third rotor 70 and the first rotor 30. In the present state, the second rotor 50 rotates relative to the first rotor 30 in the advance direction X. Thus, rotation of the second rotor 50 is accelerated, and the valve timing of the intake valve 8 or the exhaust valve 9 is advanced.

Similarly to the state where the motor shaft 64 rotates relative to the first rotor 30 in the retard direction Y, when the electric motor 61 quickly stops, the third rotor 70 performs the planetary motion. In the present state, the second rotor 50 rotates relative to the first rotor 30 in the advance direction X. Thus, rotation of the second rotor 50 is accelerated, and the valve timing of the intake valve 8 or the exhaust valve 9 is advanced.

In the present configuration, the third rotor 70 is connected with the first rotor 30 and the second rotor 50 to enable transmission of rotation of the third rotor 70 to the first rotor 30 and the second rotor 50. The third rotor 70 performs the planetary motion thereby to vary the relative rotational phase between the first rotor 30 and the second rotor 50. When the rotational phase is varied, the rotation of the second rotor 50 is accelerated or decelerated, thereby to control the valve timing of the intake valve 8 or the exhaust valve 9.

Figure 13:
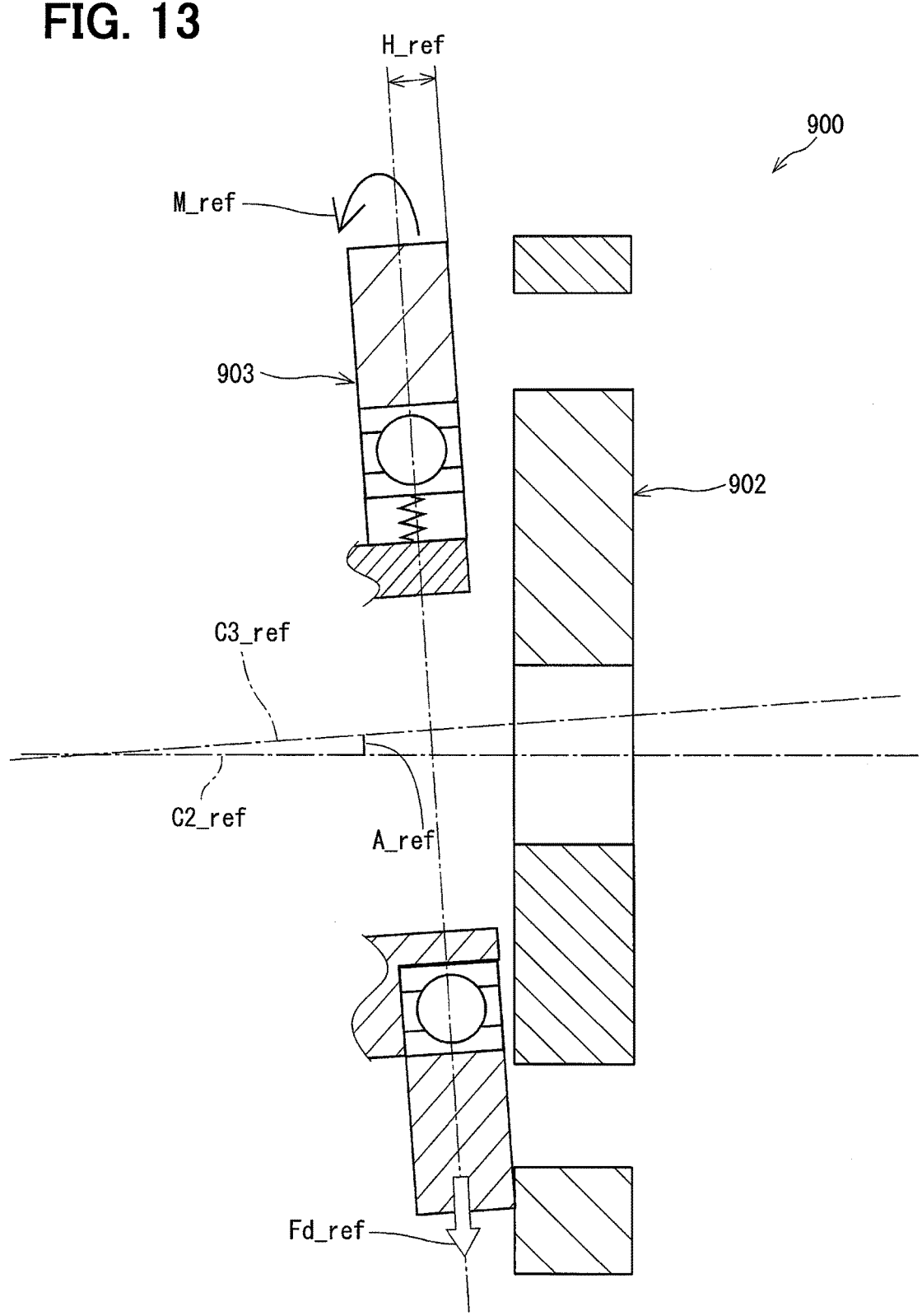
FIG. 13 is a sectional view showing a part of an eccentric oscillating reduction gear device according to a comparable example.

For example, an eccentric oscillating reduction gear device may have a configuration to enable eccentric rotation in a state where a phase between two rotors is shifted by 180 degrees. FIG. 13 shows an eccentric oscillating reduction gear device 900 according to a comparative example.

As shown in FIG. 13, the eccentric oscillating reduction gear device 900 includes a second rotor 902 having a center axis C2_ref. The eccentric oscillating reduction gear device 900 further includes a third rotor 903 having a center axis C3_ref. The center-axis C2_ref is inclined relative to the center-axis C3_ref at an inclination angle A_ref. The third rotor 903 is applied with a force Fd_ref in the radial direction. An end surface of the third rotor 903 is at a distance H_ref from the center of the third rotor 903. A rotation moment M_ref acts on the third rotor 903. The rotation moment M_ref is represented with the following relational expression (1).

$$M\_ref = Fd\_ref \times H\_ref \qquad (1)$$

When the third rotor 903 performs the planetary motion, the third rotor 903 is inclined relative to the second rotor 902 due to the rotation moment M_ref. Consequently, the inclination angle A_ref increases to cause vibration and noise. In the drawing, the illustration of the inclination angle A_ref is exaggerated in order to clearly show the relationship between the second rotor 902 and the third rotor 903.

As described in the Patent Literature 1, an eccentric oscillating reduction gear device may include three rotors in order to restrict vibration and noise. However, the configuration including three rotors may be enlarged. Moreover, the configuration may require increase in the number of components of the eccentric oscillating reduction gear device, and consequently, the configuration may require increase in its manufacturing cost. It is assumable to reduce the number of rotors in order to downsize and/or to reduce the manufacturing cost of an eccentric oscillating reduction gear device.

In a configuration including two rotors, a rotational moment (couple of force) acts on the two rotors. In the eccentric oscillating reduction gear device 900 according to the comparative example, the axes of the two rotors may be shifted relative to each other, and consequently, the two rotors may locally abrade each other. Thus, vibration and noise may arise. In consideration of these issues, the eccentric oscillating reduction gear device of the present embodiment is to restrict vibration and noise and to enable downsizing of its configuration.

Referring back to FIG. 2, in the eccentric oscillating reduction gear device 101, the fitting portion outer surface 81 is engaged with the second rotor inner surface 55. Friction arises between the fitting portion outer surface 81 and the second rotor inner surface 55. A friction coefficient of this friction is an engagement friction coefficient μe. In a case where friction arises between objects, which are made of a ferrous material, a friction coefficient of this friction is a ferrous material friction coefficient μi. The friction coefficient is a static friction coefficient or a dynamic friction coefficient.

The ferrous material may be pure iron, carbon steel containing carbon, or alloy steel containing a metallic material such as chromium, nickel, and molybdenum in addition to carbon. The carbon steel may be, for example, rolled steel for general structure, rolled steel for welded structure, or carbon steel for machine construction. The alloy steel may be, for example, alloy steel for structure. The ferrous material may contain impurity within a commonsensical error margin.

The engagement friction coefficient μe is acquired by implementing an experiment, which is in compliance with a friction coefficient experimental method of JIS_K7125, on the material of the fitting portion 80 and the material of the second rotor 50. The engagement friction coefficient μe may be acquired by using a pin-on-disk type frictional wear experimental apparatus or a two-cylinder type friction wear experimental apparatus. The ferrous material friction coefficient μi is acquired by using the same ferrous material similarly to the engagement friction coefficient μe.

The fitting portion 80 and the second rotor 50 are configured such that the engagement friction coefficient μe is greater than the ferrous material friction coefficient μi, that is, to satisfy a relationship of μe>μi.

The fitting portion 80 or the second rotor 50 is formed of resin. In the present embodiment, the second rotor 50 is formed of resin. The resin used in the present embodiment is, for example, polyamide, PEEK, or AES. PEEK is an abbreviation of polyetheretherketone. AES is an abbreviation of acrylonitrile styrene acrylate.

The second rotor inner surface 55 has an inner surface roughness Rz2_I. An outer surface 56 of the second rotor 50 has an outer surface roughness Rz2_O. The fitting portion 80 has a fitting portion surface roughness Rze_O. The third rotor 70 has a third rotor surface roughness Rz3_O. Each of the values of the surface roughness is represented with a maximum height coarseness Rz. Each of the values of the maximum height coarseness is in compliance with a definition of JIS_ B_0601. An apparatus to measure the maximum height roughness is, for example, a contact type surface roughness measurement apparatus, which uses a sensing pin and/or the like, or a non-contact type surface roughness measurement apparatus, which uses laser and/or the like.

The inner surface roughness Rz2_I is set to be greater than the outer surface roughness Rz2_O. That is, the inner surface roughness Rz2_I and the outer surface roughness Rz2_O are set to satisfy the relationship of Rz2_I>Rz2_O.

The fitting portion surface roughness Rze_O is set to be greater than the third rotor surface roughness Rz3_O. That is, the fitting portion surface roughness Rze_O and the third rotor surface roughness Rz3_O are set to satisfy the relationship of Rze_O>Rz3_O.

Figure 4:
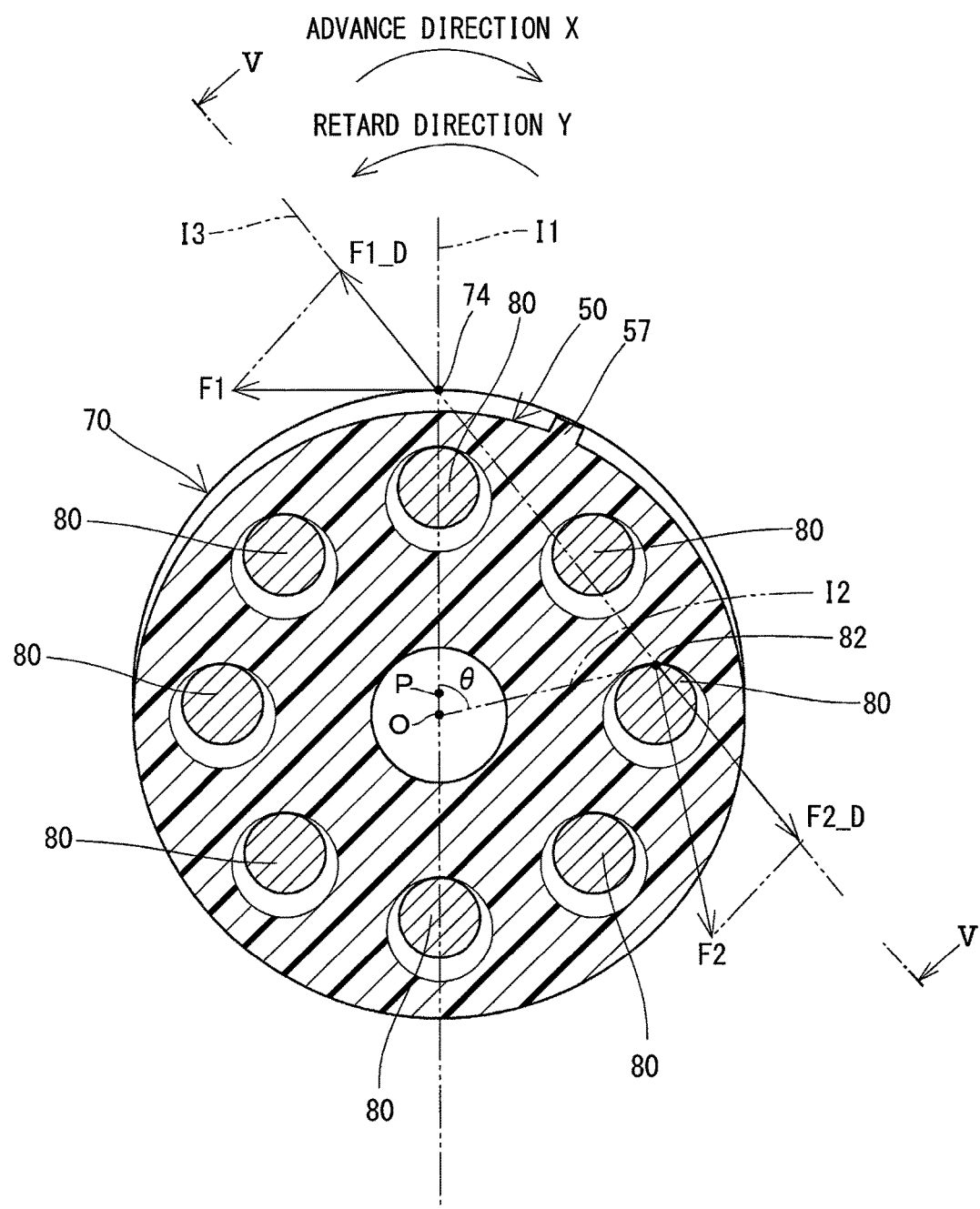
FIG. 4 is a sectional view taken along the line III, IV-III, IV in FIG. 2 and showing a second rotor and a third rotor.

As shown in FIG. 4, the first internal gear portion 34 and the third rotor 70 are in contact with each other at a third rotor contact point 74. The third rotor contact point 74 is located on the imaginary split line 11. An imaginary line 13 connects the third rotor contact point 74 with the fitting portion contact point 82. The first internal gear portion 34 exerts a force F1 onto the third rotor 70 at the third rotor contact point 74. The force F1 can be decomposed into a force F1_D, which acts in a direction along the imaginary line 13. The force F1_D is represented with a function of the force F1 and the fitting portion angle e.

A normal force F2 acts onto the fitting portion 80 at the fitting portion contact point 82 via the second rotor inner surface 55 in a direction opposite to the rotational direction. The force F2 can be decomposed into a force F2_D, which acts in a direction along the imaginary line 13. The force F2_D is represented with a function of the force F2 and the fitting portion angle e.

Figure 5:
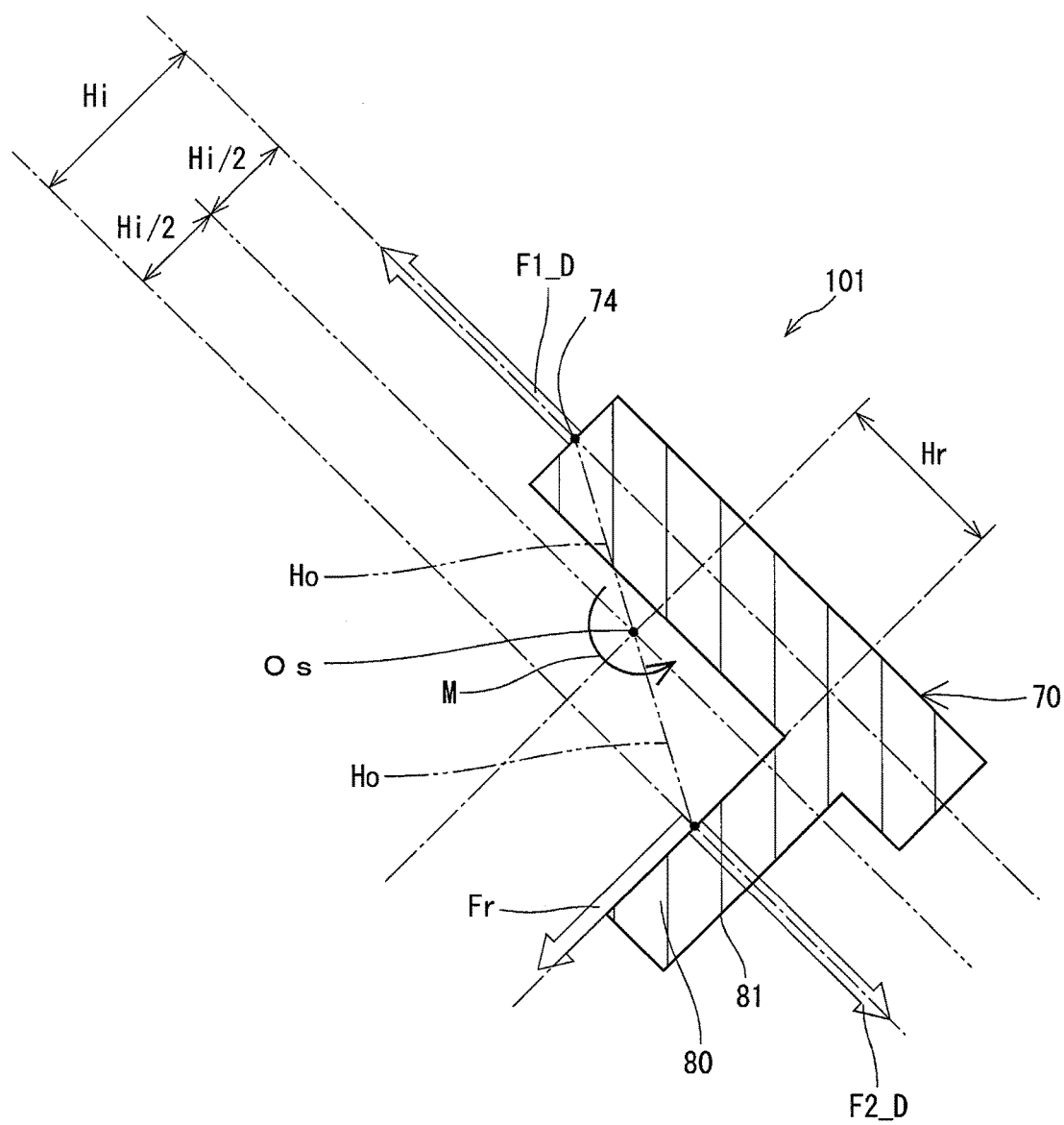
FIG. 5 is a sectional view taken along the line V-V line in FIG. 4 and showing the third rotor.

As shown in FIG. 5, the center of the third rotor 70 is at a fitting portion distance Hi from the center of the fitting portion 80 in the axial direction. A line segment, which connects the third rotor contact point 74 with the fitting portion contact point 82, has a middle point as a rotation center point Os. A distance. Ho between the rotation center point Os and the third rotor contact point 74 is the same as the distance Ho between the rotation center point Os and the fitting portion contact point 82. In FIG. 5, the third rotor 70 and the fitting portion 80 are exaggerated in order to clearly show the feature. The rotation center point Os is at a third rotor distance Hr from the fitting portion outer surface 81 in the radial direction of the third rotor 70.

The force F1_D and the force F2_D act at positions shifted from each other in the axial direction of the third rotor 70. Therefore, a rotational moment M acts on the third rotor 70 about the rotation center point Os. An initial rotational moment Ms, which causes the third rotor 70 to begin to rotate relatively, is represented with the following relational expression (2).

$$Ms = (F1\_D + F2\_D) \times Hi/2 \qquad (2)$$

When the second rotor 50 and the third rotor 70 are disengaged from each other, friction occurs between the fitting portion outer surface 81 and the second rotor inner surface 55. In the present state, a frictional force Fr acts on the fitting portion 80 in a direction in which the rotational moment M, which acts on the third rotor 70, is reduced. The frictional force Fr is represented with the following relational expression (3). When the frictional force Fr acts on the fitting portion 80, a frictional force state rotational moment Mr acts on the third rotor 70. In the present state, the rotational moment M is represented with the following relational expression (4). The rotational moment M decreases due to the frictional force Fr.

$$Fr = \mu e \times F2 \quad (3)$$

$$M = Mr - Fr \times Hr \quad (4)$$

Effect (1) The frictional force Fr acts on the fitting portion 80 in the direction in which the rotational moment M, which acts on the third rotor 70, is reduced. The ferrous material friction coefficient $\mu i$ is relatively small, and the rotational moment M may become large in a case where ferrous objects are in contact with each other. In the eccentric oscillating reduction gear device 101, the engagement friction coefficient $\mu e$ is set to be greater than the ferrous material friction coefficient $\mu i$, thereby to steadily reduce the rotational moment M. The rotational moment M is reduced, thereby to maintain the second rotor 50 and the third rotor 70 in parallel with each other. The present configuration enables to restrict the second rotor 50 and the third rotor 70 from locally abrading and to make the friction therebetween uniform when the third rotor 70 performs the planetary motion, thereby to restrict vibration and noise. Furthermore, the present configuration may not require increase in the number of rotors, which is in order to restrict vibration and noise, thereby to enable to reduce the number of components. Therefore, the eccentric oscillating reduction gear device 101 enables its downsizing.

(2) The second rotor 50 or the fitting portion 80 is made of resin. Resin is relatively small in its hardness. When friction arises, the surface of one of the second rotor 50 and the fitting portion 80 digs up (i.e., abrades, scratches) the surface of the other of the second rotor 50 and the fitting portion 80 to cause a microscopic resistance. In the present configuration, in which the second rotor 50 or the fitting portion 80 is made of resin, a digging-up component, which is the microscopic resistance, becomes larger. Therefore, the present configuration enables to increase the engagement friction coefficient $\mu e$. In this way, the present configuration enables to restrict vibration and noise.

(3) The inner surface roughness Rz2_I is greater than the outer surface roughness Rz2_O. The fitting portion surface roughness Rze_O is greater than the third rotor surface roughness Rz3_O. The present configuration increases the digging-up component, thereby to increase the engagement friction coefficient $\mu e$. In this way, the present configuration enables to restrict vibration and noise.

Second Embodiment

Figure 6:
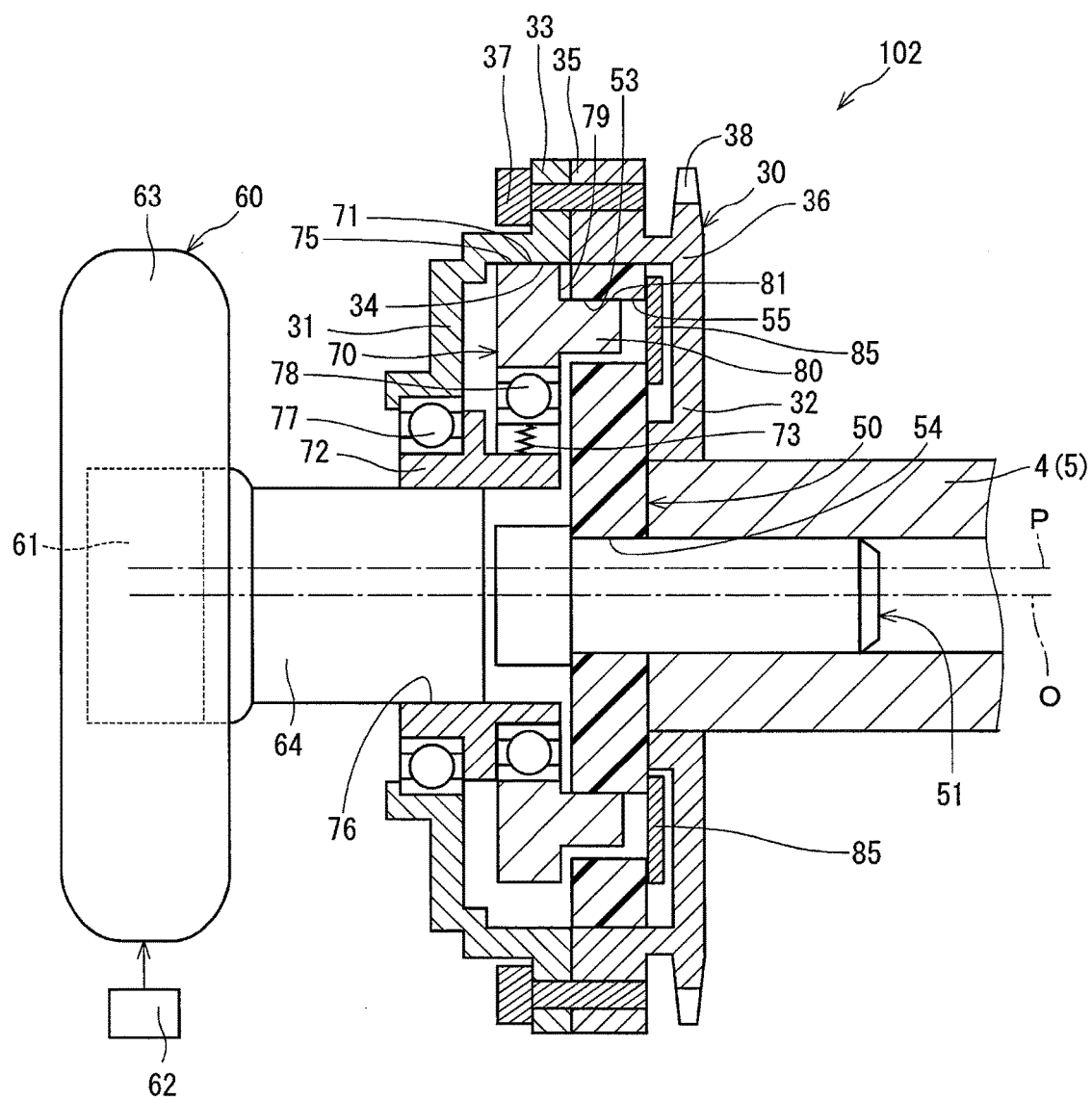
FIG. 6 is a sectional view showing an eccentric oscillating reduction gear device according to a second embodiment of the present disclosure.

The second embodiment further includes a closure portion. The second embodiment is the same as the first embodiment except for the closure portion. As shown in FIG. 6, the eccentric oscillating reduction gear device 102 of the second embodiment further includes closure portions 85. Each of the closure portions 85 has a rectangular cross-section and is greater than the engagement hole 53 in the diameter.

The closure portion 85 is in a plate shape and closes the corresponding engagement hole 53 on the opposite side of the third rotor 70. The closure portion 85 is equipped not to be in contact with the fitting portion 80. In the present configuration, the closure portion 85 restricts fluid, such as oil used for the internal combustion engine 1, from flowing into the engagement hole 53.

The second embodiment produces effects similar to those of the first embodiment. Furthermore, according to the second embodiment, because of the closure portion 85, a lubrication form of the friction between the fitting portion 80 and the second rotor 50 tends to be solid lubrication rather than boundary lubrication or fluid lubrication. Therefore, the present configuration enables to increase the engagement friction coefficient $\mu e$. In this way, the present configuration enables to restrict vibration and noise.

Third Embodiment

The present third embodiment is the same as the first embodiment except for the second rotor and the fitting portion.

Figure 7:
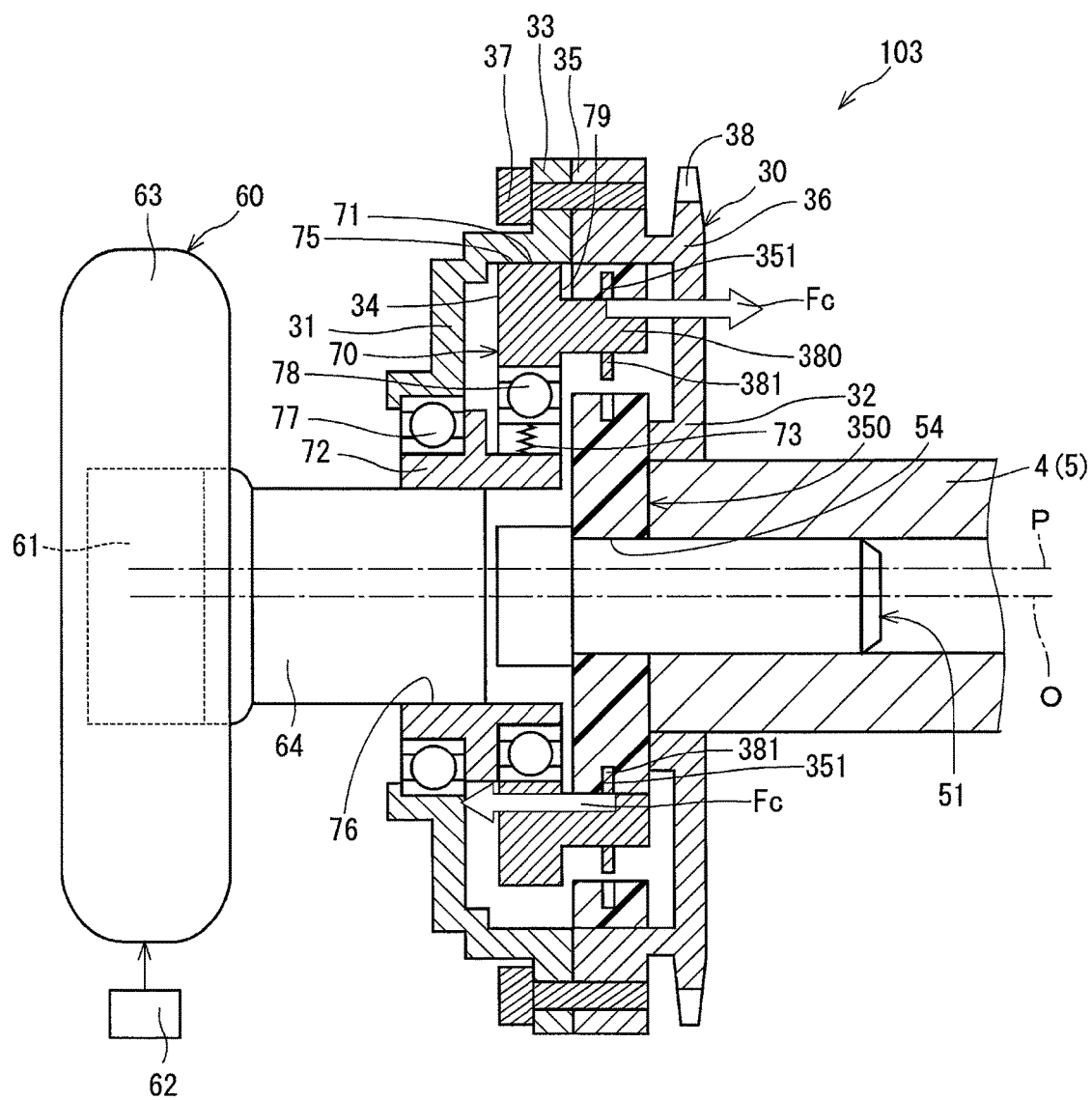
FIG. 7 is a sectional view showing an eccentric oscillating reduction gear device according to a third embodiment of the present disclosure.

As shown in FIG. 7, a second rotor 350 of the eccentric oscillating reduction gear device 103 of the third embodiment further has at least one rotor recessed portion 351. The fitting portion 380 further includes at least one engagement projected portion 381.

The rotor recessed portion 351 is formed at the center of the second rotor inner surface 55 and is recessed in an annular shape. The engagement projected portion 381 corresponds to the rotor recessed portion 351. The engagement projected portion 381 extends radially outward from the third rotor 70. The engagement projected portion 381 is in an annular shape.

The engagement projected portion 381 is configured to engage with the rotor recessed portion 351. When the rotor recessed portion 351 and the engagement projected portion 381 make contact with each other on the side of the camshaft 4 or 5, the rotor recessed portion 351 exerts a force Fc on the engagement projected portion 381 in a direction to reduce the rotational moment M. The force Fc works to increase the frictional force Fr. The third embodiment produces effects similar to those of the first embodiment. Furthermore, in the third embodiment, the force Fc increases the frictional force Fr thereby to tend to restrict vibration and noise.

Fourth Embodiment

The fourth embodiment is the same as the first embodiment except for the second rotor and the fitting portion.

Figure 8:
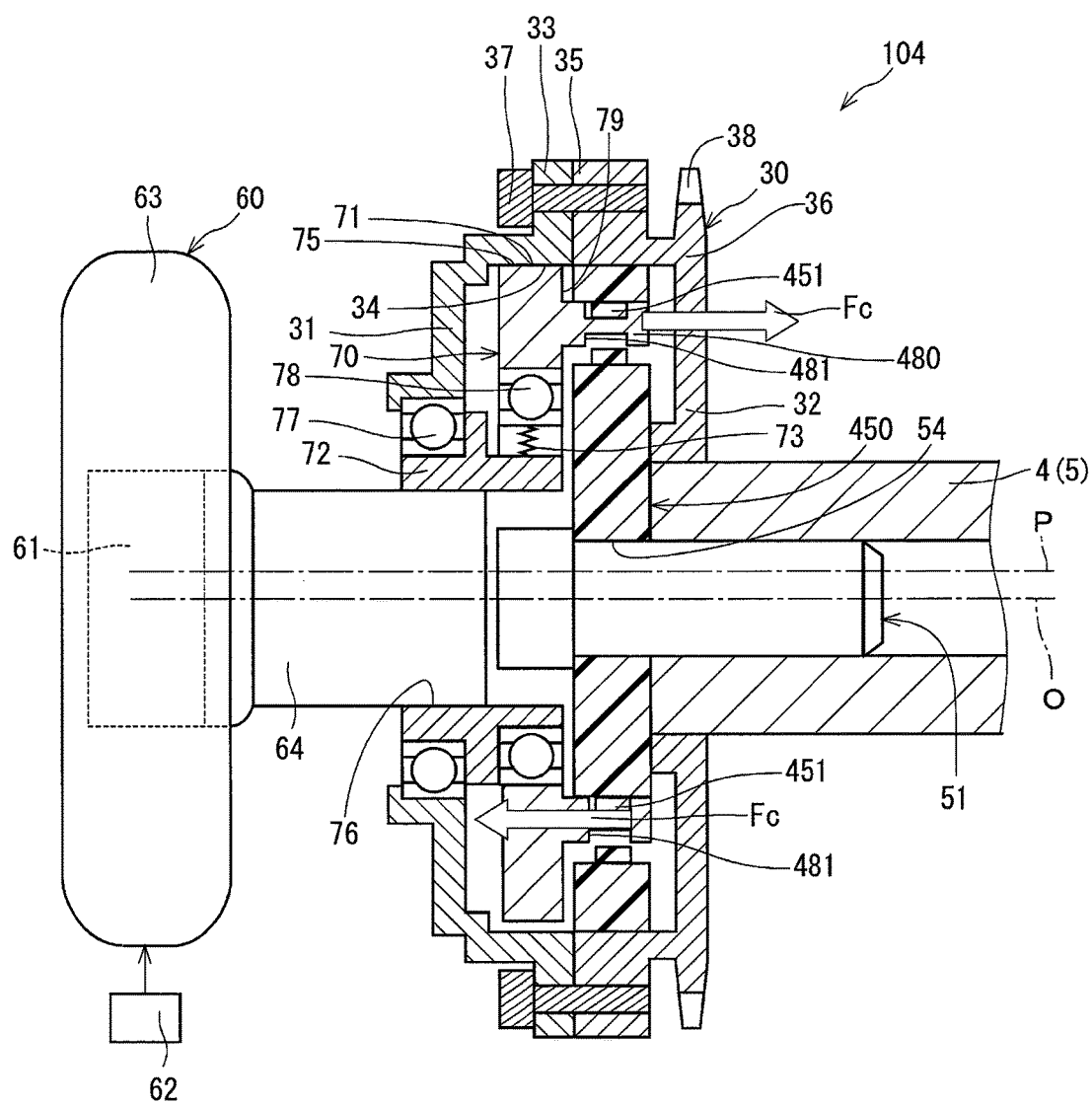
FIG. 8 is a sectional view showing an eccentric oscillating reduction gear device according to a fourth embodiment of the present disclosure.

As shown in FIG. 8, a second rotor 450 of the eccentric oscillating reduction gear device 104 of the fourth embodiment further includes at least one rotor projected portion 451. The fitting portion 480 includes at least one fitting recessed portion 481.

The rotor projected portion 451 is formed at the center of the second rotor inner surface 55. The rotor projected portion 451 extends from the second rotor inner surface 55 outward in the radial direction of the second rotor 450. The rotor projected portion 451 extends radially inward from the second rotor inner surface 55. The fitting recessed portion 481 corresponds the rotor projected portion 451. The fitting portion 480 is recessed at the fitting recessed portion 481 to be small in the diameter.

The rotor projected portion 451 is configured to engage with the fitting recessed portion 481. When the fitting recessed portion 481 and the rotor projected portion 451 is in contact with each other on the side of the camshaft 4 or 5, the rotor projected portion 451 exerts the force Fc on the engagement projected portion 381. The force Fc works to increase the frictional force Fr. The fourth embodiment produces effects similar to those of the first embodiment and the third embodiment.

Fifth Embodiment

The fifth embodiment is the same as the first embodiment except for the second rotor and the fitting portion.

Figure 9:
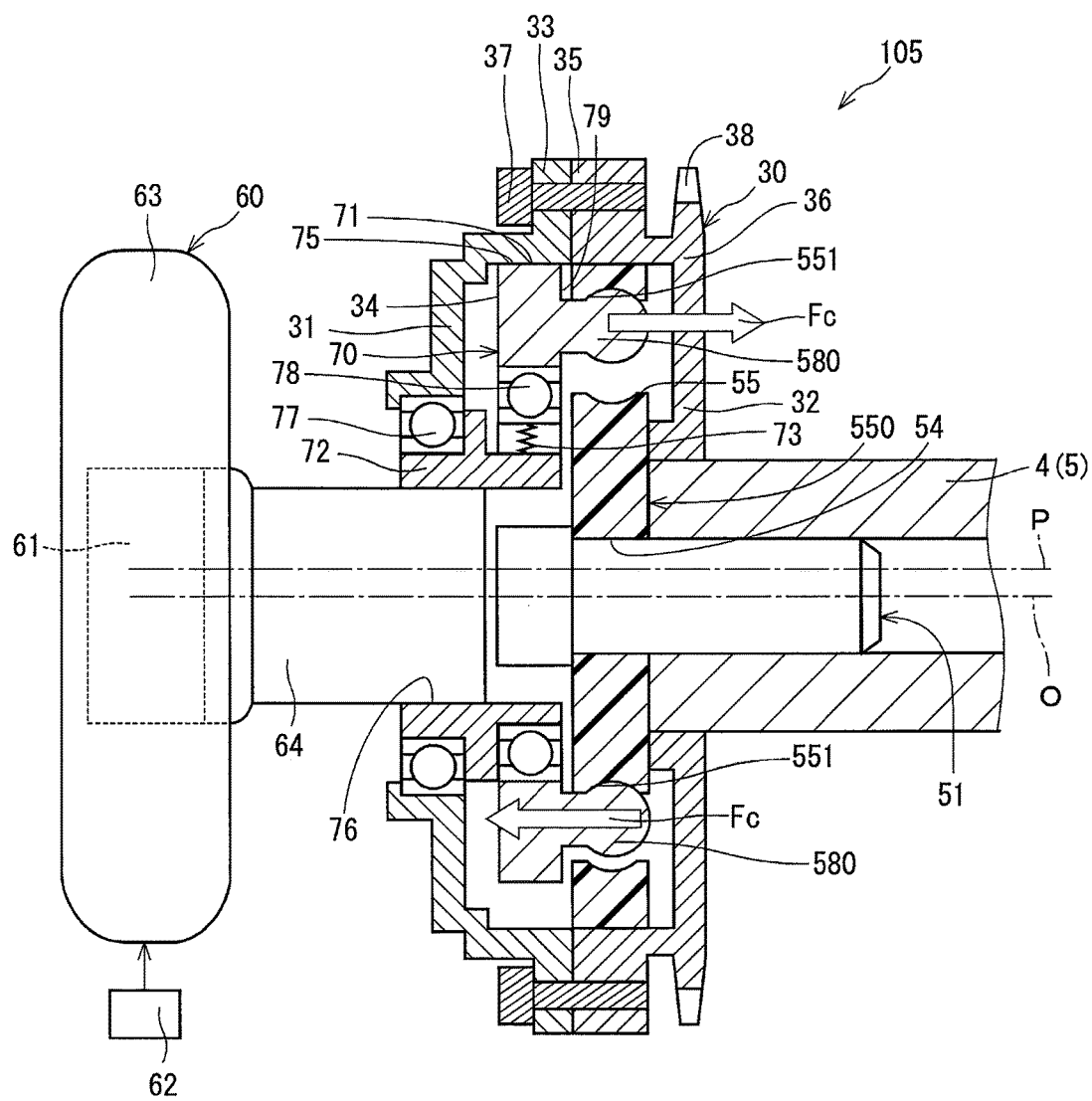
FIG. 9 is a sectional view showing an eccentric oscillating reduction gear device according to a fifth embodiment of the present disclosure.

As shown in FIG. 9, the second rotor 550 of the eccentric oscillating reduction gear device 105 of the fifth embodiment further includes at least one rotor recessed portion 551. The rotor recessed portion 551 is formed at the center of the second rotor inner surface 55 and is recessed in an annular shape. The rotor recessed portion 551 is formed so that its outer periphery is curved in a cross section taken along a line extending in the axial direction of the second rotor 550.

The fitting portion 580 is formed so that its outer periphery is curved on the side of the camshaft 4 and 5 in a cross section taken along a line extending in the axial direction of the third rotor 70. The fitting portion 580 is in a spherical shape. Furthermore, the fitting portion 580 corresponds to the rotor recessed portion 551. The fitting portion 580 is configured to engage with the rotor recessed portion 551. When the rotor recessed portion 551 and the fitting portion 580 make contact with each other, the rotor recessed portion 551 exerts the force Fc on the fitting portion 580. The frictional force Fr increases the force Fc. The fifth embodiment also produces effects similar to those of the first embodiment and the third embodiment.

Sixth Embodiment

The sixth embodiment is the same as the first embodiment except for the second rotor, the fitting portion, and further incorporation of an intermediate portion.

Figure 10:
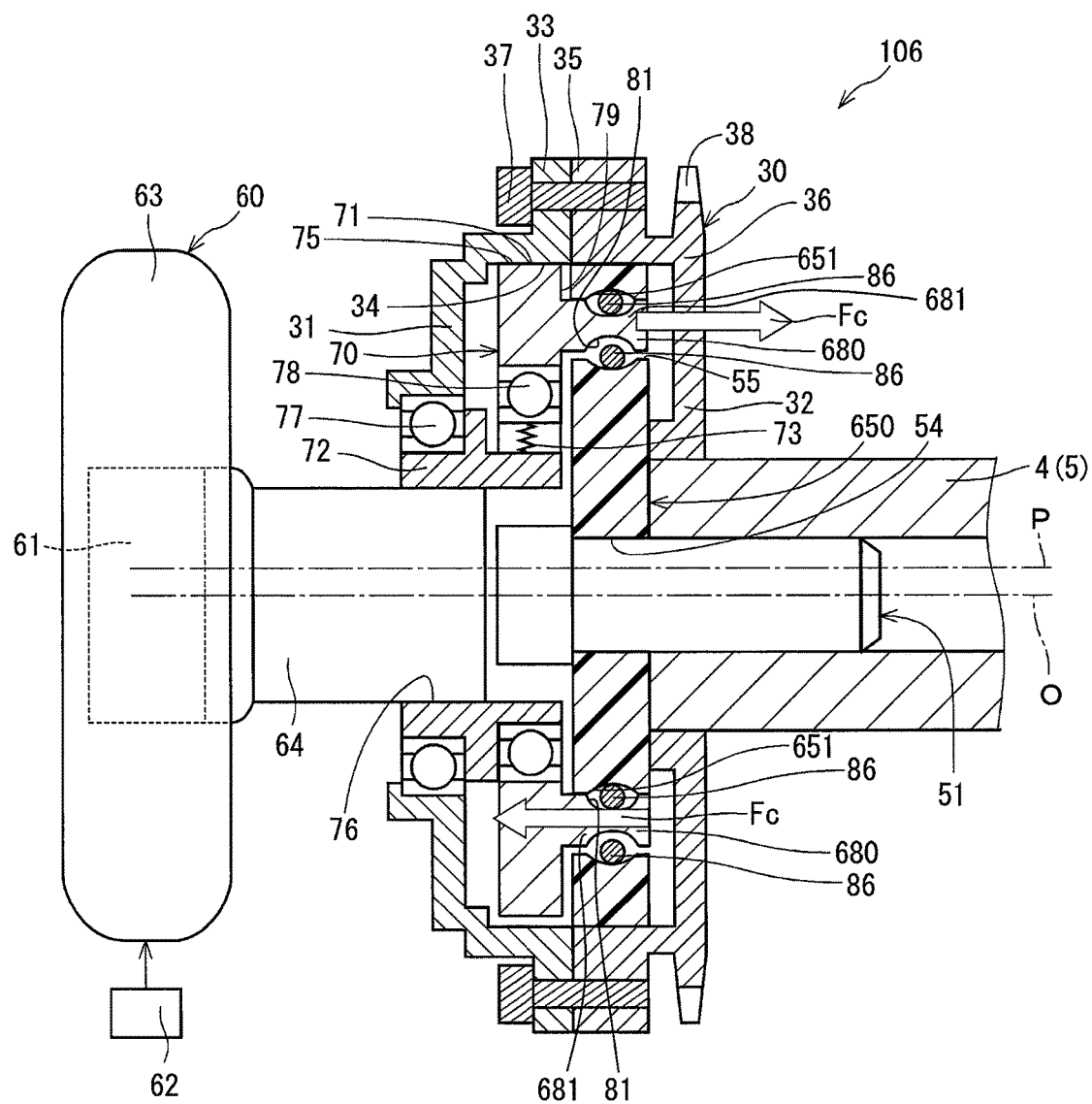
FIG. 10 is a sectional view showing an eccentric oscillating reduction gear device according to a sixth embodiment of the present disclosure.

As shown in FIG. 10, a second rotor 650 of the eccentric oscillating reduction gear device 106 of the sixth embodiment further includes at least one rotor recessed portion 651.

The rotor recessed portion 651 is formed at the center of the second rotor inner surface 55 and is recessed in an annular shape. The rotor recessed portion 651 is curved. The fitting portion 680 has a fitting recessed portion 681 at the center. The fitting portion 680 is recessed at the fitting recessed portion 681 to be small in the diameter. The outer circumferential periphery of the fitting recessed portion 681 is curved in a cross section taken along a line extending in the axial direction of the third rotor 70.

The intermediate portion 86 is located between the rotor recessed portion 651 and the fitting recessed portion 681. The intermediate portion 86 makes contact with the second rotor inner surface 55 and the fitting portion outer surface 81. The intermediate portion 86 exerts the force Fc onto the fitting recessed portion 681. The force Fc increases the frictional force Fr. The sixth embodiment also produces effects similar to those of the first embodiment and third embodiment.

Figure 11:
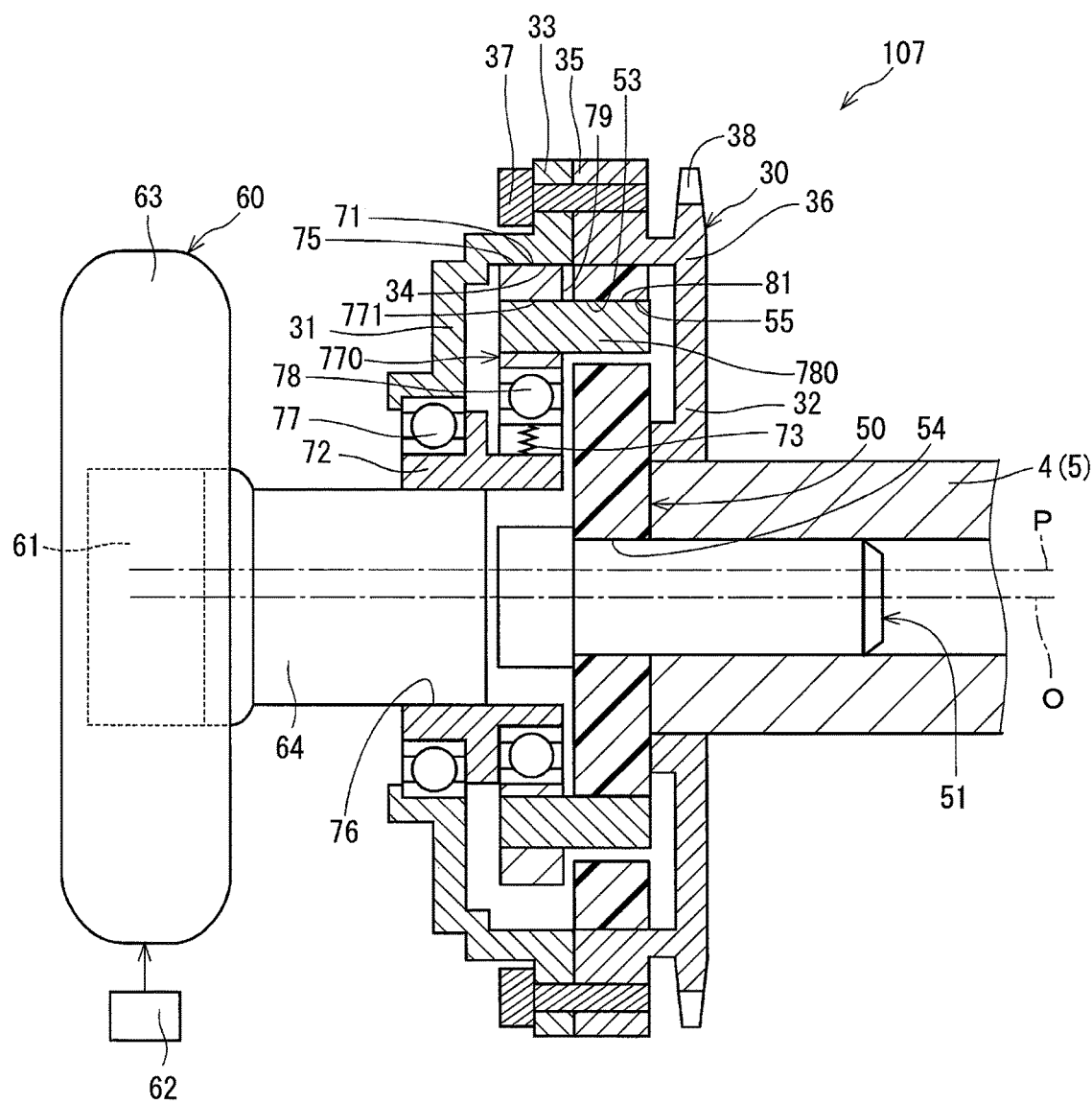
FIG. 11 is a sectional view showing an eccentric oscillating reduction gear device according to another embodiment of the present disclosure.

Other Embodiment (i) As shown in FIG. 11, the third rotor 770 and the fitting portions 780 of the eccentric oscillating reduction gear device 107 may be separate components. In this case, the third rotor 770 has fitting holes 771 corresponding to the engagement holes 53. The fitting portions 780 are inserted into both the engagement holes 53 and the fitting holes 771, respectively. The fitting portions 780 are engaged with the second rotor 50 via the engagement holes 53, respectively. The fitting portions 780 are engaged with the third rotor 770 via the fitting holes 771. The present embodiment also produces the effects same as those of the first embodiment. The present configuration, in which the third rotor 770 and the fitting portions 780 are separate components, facilitates manufacturing of the eccentric oscillating reduction gear device 107.

(ii) The surface roughness of the inner surface of the second rotor, the outer surface of the second rotor, the fitting portions, and the third rotor is not limited to the maximum height roughness and may be an arithmetic average roughness Ra, an average height Rc, a root mean square height Rq or the like.

(iii) The sidewall of the fitting portion may have a groove. In this case, a snap ring, which has a notch to enable engagement with the groove, may be used for the engagement projected portion. Alternatively, the sidewall of a snap ring may have a groove. In this case, the fitting portion may have a notch. The notch of the fitting portion may be fitted to the groove of the snap ring, thereby to form an engagement projected portion.

Figure 12:
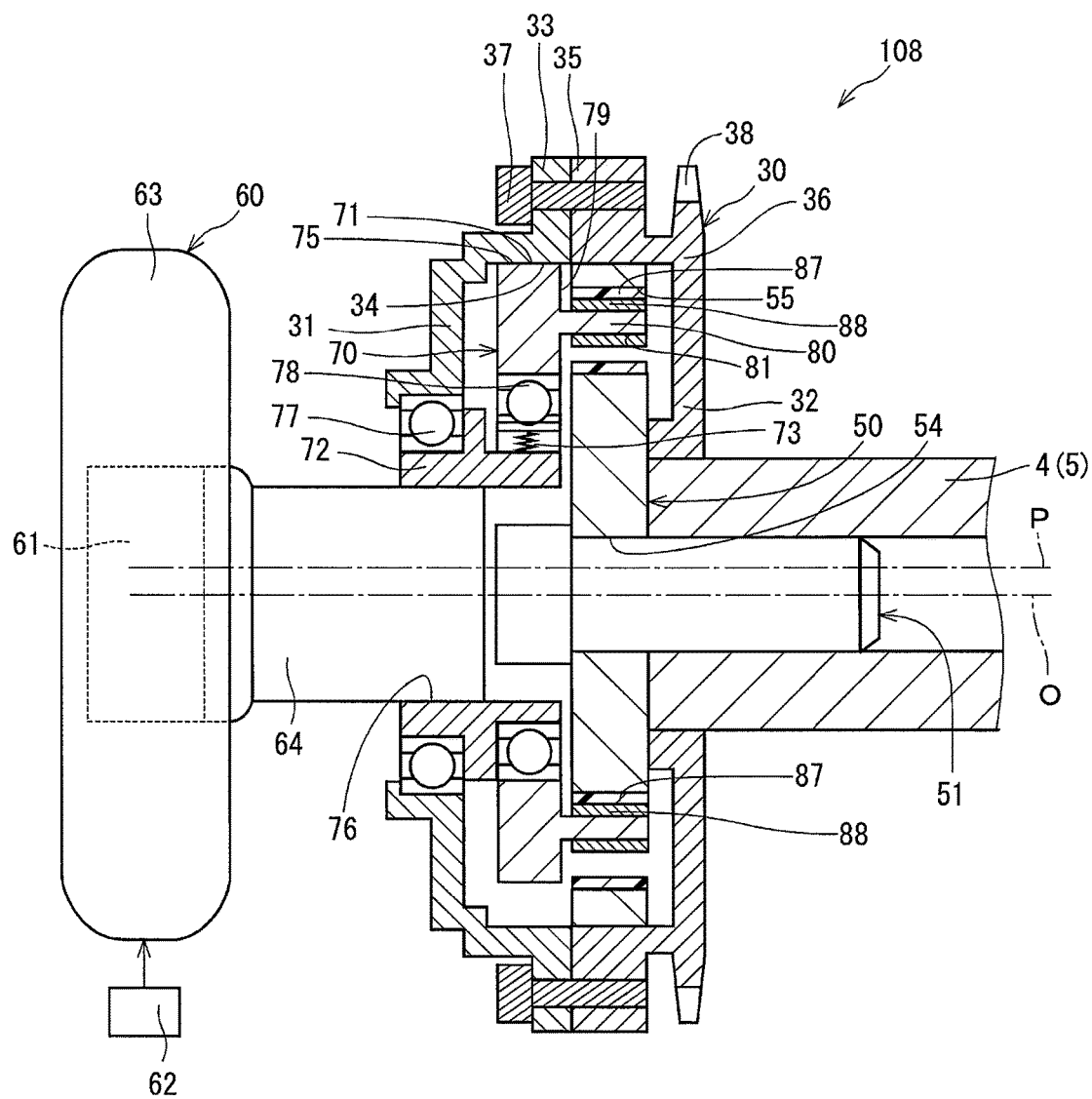
FIG. 12 is a sectional view showing an eccentric oscillating reduction gear device according to another embodiment of the present disclosure.

(iv) As shown in FIG. 12, a coating 87 may be formed as a film on the second rotor inner surface 55 of the eccentric oscillating reduction gear device 108. The coating 88 may be formed as a film on the fitting portion outer surface 81. In the drawing, the coating 87 and 88 is exaggerated in order to clearly illustrate the coating 87 and 88.

The coating 87 is formed by using resin. The coating 87 is formed as a film on the second rotor inner surface 55. The coating 88 is formed as a film on the fitting portion outer surface 81. The coating 87 and 88 is formed such that a friction coefficient $\mu c$ of friction, which arises between the coating 87 and the coating 88, becomes greater than the ferrous material friction coefficient $\mu i$. The present embodiment also produces the effects same as those of the first embodiment.

(v) The cross-section of the fitting portion taken along the radial direction is not limited to the circular shape and may be an ellipse shape, a polygonal shape, or a star shape.

As described above, the eccentric oscillating reduction gear device includes the first rotor 30, the second rotor 50, 350, 450, 550, 650, the third rotor 70, 770, and the at least one fitting portion 80, 380, 480, 580, 680, 780. The first rotor is rotational. The second rotor is accommodated in the first rotor and is rotational. The second rotor has the at least one engagement hole 53.

The third rotor is opposed to the second rotor and is accommodated in the first rotor. When the third rotor rotates about the axis P, which is eccentric to the axis O of the first rotor, the relative rotational phase between the first rotor and the second rotor varies, and the third rotor accelerates or decelerates rotation of the second rotor.

The fitting portion is equipped to the third rotor. The outer surface 81 of the fitting portion is opposed to the inner surface 55 of the second rotor. The inner surface of the second rotor is located in the engagement hole. The fitting portion engages with the second rotor via the engagement hole. When friction arises between the inner surface of the second rotor and the outer surface of the fitting portion, the frictional force acts in the direction to reduce the rotational moment, which acts on the third rotor. The friction coefficient between the inner surface of the second rotor and the outer surface of the fitting portion is greater than the friction coefficient between ferrous objects.

The friction coefficient between ferrous objects is relatively small, and therefore, the rotational moment of the third rotor may become large. By setting the friction coefficient between the inner surface of the second rotor and the outer surface of the fitting portion to be greater than the friction coefficient between the ferrous objects formed of ferrous material, the rotational moment can be reduced. The present configuration enables to reduce the rotational moment, thereby to enable to maintain the second rotor and the third rotor in parallel. The present configuration enables to reduce local friction between the second rotor and the third rotor when the third rotor rotates, thereby to render the operation smooth and to reduce vibration and noise. Furthermore, the present configuration does not require increase in the number of the rotors, thereby to reduce the number of the components. The present configuration enables to downsize the eccentric oscillating reduction gear device.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. An eccentric oscillating reduction gear device comprising:
   a first rotor being rotational;
   a second rotor accommodated in the first rotor, the second rotor being rotational and having an engagement hole;
   a third rotor accommodated in the first rotor and opposed to the second rotor, the third rotor configured to vary a relative rotational phase of the first rotor to the second rotor and to accelerate and decelerate rotation of the second rotor, when rotating about an axis, which is eccentric relative to an axis of the first rotor; and
   a fitting portion equipped to the third rotor, the fitting portion having an outer surface opposed to an inner surface of the second rotor, the inner surface of the second rotor being located in the engagement hole, the fitting portion in the engagement hole being engaged with the second rotor, wherein
   when friction arises between the inner surface of the second rotor and the outer surface of the fitting portion, a frictional force acts in a direction to reduce a rotational moment, which acts on the third rotor, and
   a friction coefficient between the inner surface of the second rotor and the outer surface of the fitting portion is greater than a friction coefficient between ferrous objects.

2. The eccentric oscillating reduction gear device according to claim 1, wherein
   the second rotor or the fitting portion is formed of resin.

3. The eccentric oscillating reduction gear device according to claim 1, wherein
   a surface roughness of the inner surface of the second rotor is greater than a surface roughness of an outer surface of the second rotor, or
   a surface roughness of the fitting portion is greater than a surface roughness of the third rotor.

4. The eccentric oscillating reduction gear device according to claim 1, further comprising:
   a closure portion closing the engagement hole on an opposite side of the third rotor, wherein
   the closure portion is configured to restrict fluid from flowing into the engagement hole.

5. The eccentric oscillating reduction gear device according to claim 1, wherein
   the second rotor has a rotor recessed portion on the inner surface of the second rotor,
   the fitting portion has an engagement projected portion on the outer surface of the fitting portion, and
   the engagement projected portion is configured to engage with the rotor recessed portion.

6. The eccentric oscillating reduction gear device according to claim 1, wherein
   the second rotor has a rotor projected portion on the inner surface of the second rotor,
   the fitting portion has a fitting recessed portion on the outer surface of the fitting portion, and
   the rotor projected portion is configured to engage with the fitting recessed portion.

7. The eccentric oscillating reduction gear device according to claim 1, wherein
   the second rotor has a rotor recessed portion on the inner surface of the second rotor, and
   the fitting portion has a fitting recessed portion on the outer surface of the fitted portion, which is opposed to the rotor recessed portion,
   the eccentric oscillating reduction gear device further comprising:
   an intermediate portion equipped between the rotor recessed portion and the fitting recessed portion, wherein
   the intermediate portion is in contact with both the inner surface of the second rotor and the outer surface of the fitting portion and configured to exert a force on the fitting portion in the direction to reduce the rotational moment, which acts on the third rotor.

8. The eccentric oscillating reduction gear device according to claim 7, wherein
   the intermediate portion is in a spherical shape.

9. The eccentric oscillating reduction gear device according to claim 1, wherein
   the second rotor and the fitting portion are formed as separate components.

10. The eccentric oscillating reduction gear device according to claim 1, wherein
    a film is formed on each of the inner surface of the second rotor and the outer surface of the fitting portion.

* * * * *